United States Patent
Thapani et al.

(10) Patent No.: US 10,977,946 B2
(45) Date of Patent: Apr. 13, 2021

(54) VEHICLE LANE CHANGE ASSIST IMPROVEMENTS

(71) Applicant: VEONEER US, INC., Southfield, MI (US)

(72) Inventors: Ramesh Veerabhadra Pantulu Baladandayu Thapani, West Bloomfield, MI (US); Shan Cong, Superior Township, MI (US)

(73) Assignee: Veoneer US, Inc., Southfield, MI (US)

( * ) Notice: Subject to any disclaimer, the term of this patent is extended or adjusted under 35 U.S.C. 154(b) by 651 days.

(21) Appl. No.: 15/788,674

(22) Filed: Oct. 19, 2017

(65) Prior Publication Data

US 2019/0122556 A1 Apr. 25, 2019

(51) Int. Cl.
*G08G 1/16* (2006.01)
*G01S 13/931* (2020.01)
(Continued)

(52) U.S. Cl.
CPC ............ *G08G 1/167* (2013.01); *B62D 6/003* (2013.01); *B62D 15/021* (2013.01);
(Continued)

(58) Field of Classification Search
None
See application file for complete search history.

(56) References Cited

U.S. PATENT DOCUMENTS 6,092,619 A * 7/2000 Nishikawa ........... B62D 15/025
                                                       180/204
7,016,783 B2 * 3/2006 Hac ....................... G08G 1/167
                                                       701/301
(Continued)

FOREIGN PATENT DOCUMENTS

CN    101799992 A    8/2011
CN    102529975 A    7/2012
(Continued)

OTHER PUBLICATIONS

Kichun Jo, Interacting Multiple Model Filter-Based Sensor Fusion of GPS With In-Vehicle Sensors for Real-Time Vehicle Positioning , Mar. 2012, IEEE Transaction on intelligent transportation systems, vol. 13, No. 1 (Year: 2012).*
(Continued)

*Primary Examiner* — Nicholas K Wiltey
(74) *Attorney, Agent, or Firm* — Matthew D. Thayne; Thayne and Davis LLC (57) ABSTRACT

Systems and methods for lane change prediction, detection, and/or confirmation. In some embodiments, a vehicle yaw rate associated with a vehicle may be detected and a set of vehicle yaw rate data may be generated. A steering angle associated with the vehicle may also be detected and a set of vehicle steering angle data generated. A first filter model may be used to process the vehicle yaw rate data. The vehicle steering angle data may be used to confirm a suspected lane change. A parameter threshold may be applied to the processed vehicle yaw rate data and, upon exceeding the parameter threshold and upon confirmation of the suspected lane change from the vehicle steering angle date, a parameter of a lane change assist system of the vehicle may be adjusted.

9 Claims, 4 Drawing Sheets

(51) Int. Cl.
  *G07C 5/08* (2006.01)
  *B62D 15/02* (2006.01)
  *B62D 6/00* (2006.01)

(52) U.S. Cl.
  CPC ........ *B62D 15/0255* (2013.01); *G01S 13/931* (2013.01); *G07C 5/0808* (2013.01); *G01S 2013/932* (2020.01)

(56) References Cited

U.S. PATENT DOCUMENTS

| | | | |
|---|---|---|---|
| 8,165,776 B2 | 4/2012 | Sugawara et al. | |
| 8,874,342 B2 | 10/2014 | Noda | |
| 9,111,400 B2* | 8/2015 | Bando | G07C 5/08 |
| 9,180,881 B2* | 11/2015 | Lim | B60W 10/184 |
| 9,592,829 B2 | 3/2017 | Roelke et al. | |
| 9,783,101 B2* | 10/2017 | Jeng | B60Q 1/346 |
| 2003/0100992 A1* | 5/2003 | Khosla | G01C 21/26 701/514 |
| 2005/0027403 A1* | 2/2005 | Nagai | G01D 3/032 701/1 |
| 2005/0225477 A1* | 10/2005 | Cong | G01S 13/723 342/70 |
| 2008/0183419 A1* | 7/2008 | Cong | G01S 13/931 702/155 |
| 2009/0292468 A1* | 11/2009 | Wu | G91S 13/867 701/301 |
| 2010/0191421 A1 | 7/2010 | Nilsson | |
| 2011/0187520 A1* | 8/2011 | Filev | B60W 40/09 340/438 |
| 2012/0095649 A1* | 4/2012 | Klier | B62D 6/04 701/41 |
| 2012/0150437 A1 | 6/2012 | Zeng et al. | |
| 2016/0244056 A1* | 8/2016 | Seguchi | B60W 10/06 |
| 2018/0239017 A1* | 8/2018 | Milschewski | G01S 15/876 |
| 2019/0337522 A1* | 11/2019 | Hong | G06N 7/005 |
| 2020/0139779 A1* | 5/2020 | Goto | B60G 15/067 |
| 2020/0207412 A1* | 7/2020 | Al Assad | B62D 6/003 |

FOREIGN PATENT DOCUMENTS

| | | |
|---|---|---|
| JP | 2008249639 A | 3/2012 |
| JP | 2012127896 A | 7/2012 |

OTHER PUBLICATIONS

Toledo-Moreo, IMM-Based Lane-Change Prediction in Highways with Low-cost GPS/INS, Mar. 2009, IEEE Transaction on intelligent transportation systems, vol. 10, No. 1 (Year: 2009).*
Weiss, Multiple-Model Tracking for the Detection of Lane Change Maneuvers, 2004, IEEE Intelligent Vehicles Symposium (Year: 2004).*
CN101799992A—Translation (13 pgs).
CN102529975A—Translation (14 pgs).
JP2008249639A—Translation (12 pgs).
JP2012127896A—Translation (9 pgs).
Dec. 4, 2018 PCT/US18/56127 International Search Report (2 pgs).
Dec. 4, 2018 PCT/US18/56127 Written Opinion (5 pgs).

* cited by examiner

VEHICLE LANE CHANGE ASSIST IMPROVEMENTS

SUMMARY

Lane change assist systems typically identify a region or zone of interest within which the remote detection components, such as RADAR modules, of such systems, will search for targets for alerting drivers and/or assisting drivers in safely changing lanes. Predicting, detecting, and/or confirming lane changes may therefore be of particular importance to lane change assist systems and/or other driver assist features of modern vehicles. This is because, in some cases, it may be desirable to reset/recalculate/update the zone of interest upon confirming that the host vehicle has made a lane change.

The present inventors have therefore determined that it would be desirable to provide systems and methods that improve upon lane change prediction, detection, and/or confirmation to improve the accuracy of the lane change assist systems and/or other relevant systems of a vehicle. Thus, in some embodiments, the inventive concepts disclosed herein may be used to detect host vehicle lane changes and update a zone of interest for a lane change assist system in accordance with the new host vehicle lane to improve the accuracy of the feedback of the system.

In a more particular example of a method for vehicle lane change detection according to some implementations, the method may comprise detecting at least one of a vehicle yaw rate and a steering angle associated with a vehicle and generating a set of lane change data from the at least one of a vehicle yaw rate and a steering angle. A first filter model may be used to process the lane change data, such as by fitting the vehicle yaw rate and/or steering angle data into an IMM filter having multiple models, for example. At least a subset of the processed lane change data may be compared with a threshold, such as an innovation covariance threshold. Upon detecting that the at least a subset of the processed lane change data has exceeded the threshold, the first filter model may be switched to a second filter model. The second filter model may then be used to process the lane change data.

Some implementations may comprise, after the step of switching the first filter model to the second filter model, comparing at least a subset of the processed lane change data with a second threshold; and upon detecting that at least a subset of the processed lane change data has exceeded the second threshold, switching the second filter model to the first filter model.

In some implementations, a switch from the first filter model to the second filter model may be used to predict a vehicle lane change.

The first filter model may comprise, for example, a high vehicle maneuvering model, and the second filter model may comprise a steady vehicle maneuvering model.

In some implementations, the step of detecting at least one of a vehicle yaw rate and a steering angle associated with a vehicle may comprise detecting both a vehicle yaw rate and a steering angle associated with the vehicle, both of which may be processed and used to predict, detect, and/or confirm a host vehicle lane change.

In some implementations, the lane change data includes the vehicle yaw rate but does not include the steering angle. In some such implementations, the steering angle may be used to predict or confirm a lane change but may not be used in switching filter models. In some such implementations, a switch from the first filter model to the second filter model may be used to predict a vehicle lane change and a full-cycle confirmation of the steering angle may be used to confirm the vehicle lane change.

In some implementations, upon confirmation of a vehicle lane change using both the switch from the first filter model to the second filter model and the full-cycle confirmation of the steering angle, a parameter of a lane change assist system of the vehicle, such as resetting a zone of interest of the lane change assist system, may be adjusted in response to the lane change confirmation.

In another example of a method for vehicle lane change assistance according to some implementations, the method may comprise detecting a vehicle yaw rate associated with a vehicle; generating a set of vehicle yaw rate data; detecting a steering angle associated with the vehicle; and generating a set of vehicle steering angle data. A first filter model, such as a slow/steady model of an IMM filter, may be used to process the vehicle yaw rate data. The vehicle steering angle data may be used to confirm a suspected lane change. A parameter threshold may be applied to the processed vehicle yaw rate data such that, upon exceeding the parameter threshold and/or upon confirmation of the suspected lane change from the vehicle steering angle data, a parameter of a lane change assist system of the vehicle may be adjusted.

In some implementations, the step of applying a threshold parameter to the processed vehicle yaw rate data may comprise comparing at least a subset of the processed vehicle yaw rate data with a threshold. Some implementations may further comprise, upon detecting that the at least a subset of the processed vehicle yaw rate data has exceeded the parameter threshold, switching the first filter model to a second filter model.

Some implementations may further comprise using the second filter model to process the vehicle yaw rate data.

In some implementations, the step of using the vehicle steering angle data to confirm a suspected lane change may comprise seeking to identify a half-cycle in a sinusoidal pattern derivable from the vehicle steering angle data; and seeking to identify a full-cycle in the sinusoidal pattern. In some such implementations, a full-cycle may be identified by confirming that a half cycle of the pattern in one direction (positive or negative) has extended past zero, or extended past zero by a predetermined amount, in the opposite direction.

In some implementations, upon identification of the half-cycle absent the full-cycle, a determination may be made that the suspected lane change has not taken place, which may cause a relevant algorithm to reset.

In some implementations, identification of the half-cycle and identification of the full-cycle may be used to confirm that the suspected lane change has taken place.

In an example of a system for assisting in vehicle lane changes according to some embodiments, the system may comprise a vehicle directional sensor configured to obtain directional data relating to a direction of a vehicle; a remote detection module, such as a RADAR module, a LIDAR module, a camera, or the like, configured to obtain environmental data relating to objects adjacent to the vehicle; a zone-of-interest module configured to determine an adjacent region of a vehicle in which the remote detection module obtains the environmental data; and a filter module configured to process the directional data to obtain processed directional data. The filter module may comprise a steady and/or slow filter sub-module and a dynamic and/or fast filter sub-module. The filter module may be configured to switch from the steady/slow filter sub-module to the dynamic/fast filter sub-module upon detecting that the at least a subset of the processed directional data has exceeded a threshold.

In some embodiments, the zone-of-interest module may be configured to reset at least one parameter of the adjacent region in response to detecting that the filter module has switched from the steady/slow filter sub-module to the dynamic/fast filter sub-module.

In some embodiments, the vehicle directional sensor may comprise a vehicle yaw rate sensor. Some embodiments may further comprise a steering wheel angle sensor configured to detect a steering wheel angle associated with the vehicle and generate a set of vehicle steering angle data. In some such embodiments, the zone-of-interest module may be configured to reset at least one parameter of the adjacent region in response to detecting that the filter module has switched from the steady/slow filter sub-module to the dynamic/fast filter sub-module and upon detecting that the steering wheel angle has undergone a full-cycle in a sinusoidal pattern derivable from the vehicle steering angle data.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to predicting, detecting, and/or confirming host vehicle lane changes. This prediction, detection, and/or confirmation may be used to improve the functionality of, for example, a vehicle lane change system by allowing the system to more accurately maintain the current position/lane of the host vehicle and its surroundings. More particularly, for example, some embodiments and implementations may be used to update/recalculate a zone of interest in which one or more vehicle systems may search for external targets for use in warning drivers of incoming traffic and improving the safety of vehicle lane changes.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
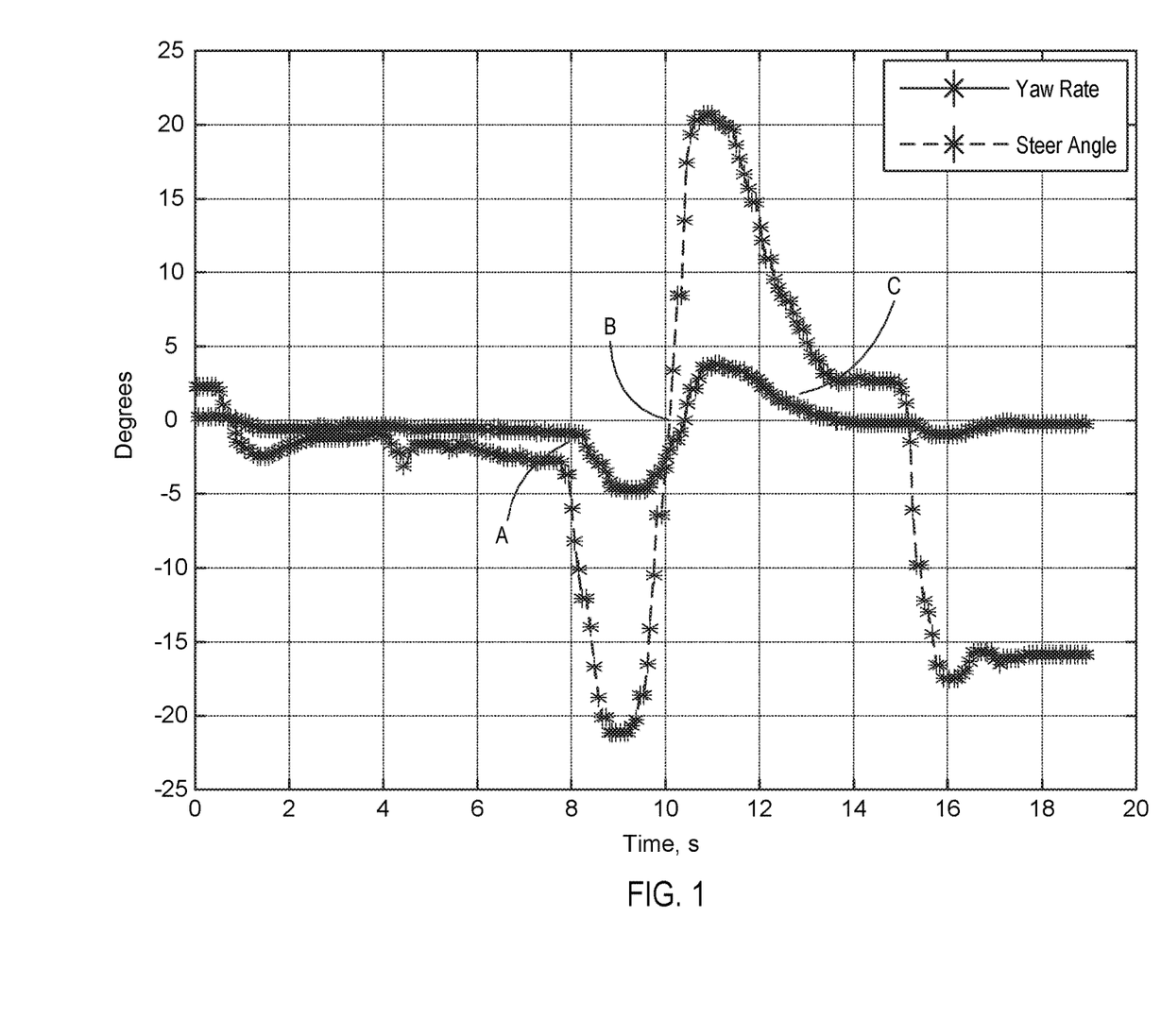
FIG. 1 is a graph depicting sinusoidal patterns in vehicle yaw rates and steering angles that are indicative of a vehicle lane change.

FIG. 1 is a graph depicting sinusoidal patterns in vehicle yaw rates and steering angles that are indicative of a vehicle lane change. As can be seen in this graph, the patterns are noisy and only generally resemble the shape of a sine wave. However, as with a sine wave, both the yaw rate and the steer angle generally comprise an onset, as indicated at point A, a half-cycle region, as indicated at point B, and a full-cycle region, as indicated at point C. Thus, as used herein, the term "sinuisoidal" is intended to encompass any pattern exhibiting the basic and fundamental features of a sine wave or portion of a sine wave (a half-cycle of a sinusoidal pattern may still be referred to herein as "sinuisoidal" in part, for example).

As described in greater detail below, a lane change may be predicted, detected, and/or confirmed by use of data used to generate one or both of the two curves in FIG. 1. Thus, for example, a steering angle sensor may be used to generate the data used to generate the steer angle sinusoidal pattern of FIG. 1 and a yaw rate sensor may be used to generate the data used to generate the yaw rate sinusoidal pattern of FIG. 2. Although both of the two sinusoidal patterns of FIG. 1 represent a typical pattern indicative of a vehicle lane change, as described below, various other patterns, such as incomplete or half-cycle sinusoidal patterns, may be used to confirm that a lane change has not taken place and/or terminate an algorithm for predicting, detecting, and/or confirming a possible lane change.

Figure 2:
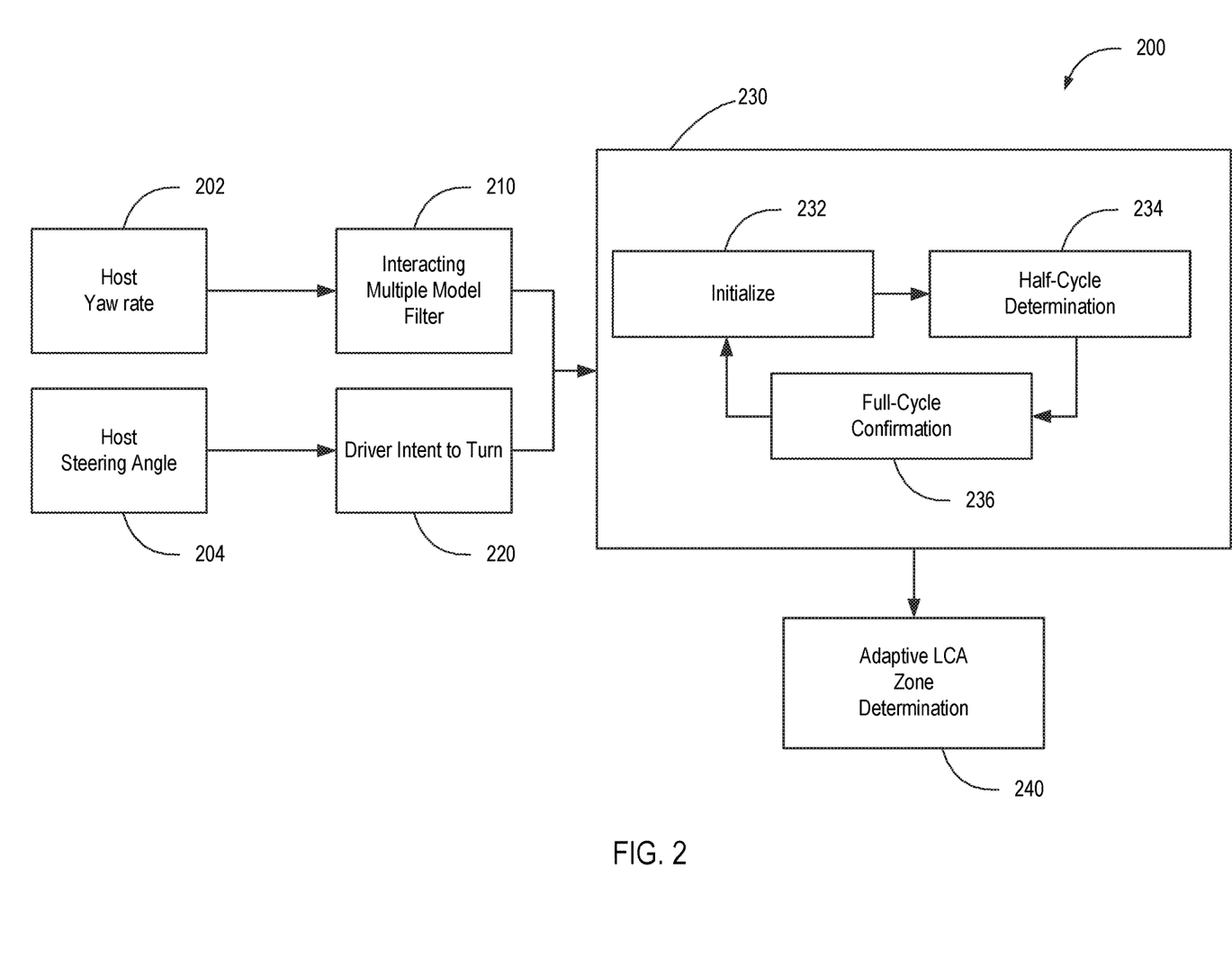
FIG. 2 is a schematic flowchart representing a method for predicting, detecting, and/or confirming a vehicle lane change according to some implementations, which may be used to improve a vehicle lane change assist system.

FIG. 2 is a schematic flowchart representing a method 200 for predicting, detecting, and/or confirming a vehicle lane change according to some implementations. Method 200 may be incorporated within, for example, a vehicle lane change assist system or the like. As shown in this figure, method 200 may comprise detecting a host vehicle yaw rate and/or a host steering angle associated with a host vehicle. The host vehicle yaw rate data 202 may be obtained, for example, by a yaw-rate sensor. The steering angle data 204 may be obtained, for example, by a steering wheel sensor.

The vehicle yaw rate data 202 and/or a steering angle data 204 may be used in a filter model, such as an interacting multiple model (IMM) filter, as described in greater detail below. For example, in the exemplary method 200, vehicle yaw rate data 202 may be processed using IMM filter 210.

In preferred embodiments and implementations, IMM filter 210 may be configured to use multiple models in parallel to fit the yaw rate signal data.

More particularly, IMM filter 210 may comprise a "slow" or "steady maneuvering" model, which may be used during normal vehicle operation and a "fast" or "high maneuvering" model, which may be indicative of vehicle turning and may be used during periods of more active lateral displacement of the vehicle. In some embodiments and implementations, IMM filter 210 may be configured to employ innovation covariance criteria to select which of the models best fits the yaw rate signal. As explained below, IMM filter 210 may be configured to use a switch between the slow model and the fast model to predict the onset of a lane change maneuver.

As also shown in FIG. 2, the host steering angle data 204 may, in some embodiments and implementations, be used at 220 to predict a driver's intent to turn based upon, for example, a steering wheel angle. For example, a steering wheel angle value exceeding an n-point moving average filtered threshold value may be used as an initial predictor of a driver's intent to turn.

For example, a seven point moving average filter may be used, which results in a ratio between moving average filter and instantaneous value (i.e., steering wheel angle exceeds the steering wheel angle average by at least a threshold degree value x). This may be calculated as follows:

steerAngleAvg=moving_average(steerAngleBuffer, sizeOfSteerAngBuffer,7)intentToTurn=int16(abs (steerAngle−steerAngleAvg)>x)

Of course, the formulas and/or thresholds used to predict a driver's intent to turn may vary by vehicle. Thus, in some embodiments and implementations, step 220 may comprise predicting a driver's intent to turn based upon exceeding a threshold difference between an average steering wheel angle and a current steering wheel angle of between about 0.5 degrees and about 20 degrees.

Following confirmation of a switch between sub-models of IMM filter 210 (in particular, between a steady/slow model and a high-maneuvering/fast model) and confirmation of an initial driver intent to turn 220, method 200 may proceed to perform a lane change confirmation 230. In some embodiments and implementations, lane change confirmation 230 may comprise an initialization step 232, which may be triggered upon confirmation of initial driver intent to turn 220 and a switching between IMM filter 210 models.

A half-cycle determination may then be made at 234. In some embodiments and implementations, step 234 may comprise seeking to detect a pattern derivable from the yaw rate data 202 and/or the steering angle data 204 similar to that shown between points A and B in the graph of FIG. 1. In other words, step 234 may comprise seeking to identify a pattern derivable from the yaw rate data 202 and/or the steering angle data 204 that resembles, or sufficiently resembles, a half sine wave. Upon confirmation of such a pattern, lane change confirmation 230 may proceed to step 236, which may comprise seeking to detect a pattern derivable from the yaw rate data 202 and/or the steering angle data 204 similar to that shown between points A and C in the graph of FIG. 1. In other words, step 236 may comprise seeking to identify a pattern derivable from the yaw rate data 202 and/or the steering angle data 204 that resembles, or sufficiently resembles, a full sine wave.

In some embodiments and implementations, a lane change confirmation may be confirmed prior to detecting the full sine wave, however. For example, a lane change may be confirmed in lane change confirmation 230 by simply detecting that data has been obtained indicative of a half-cycle continuing in the direction of a full cycle. This may be used to confirm the lane change and terminate the confirmation algorithm/process. This may, for example, take place upon confirming that a half-cycle sine wave has changed signs (extended past zero degrees from a half-sine wave in either the positive or negative direction—see FIG. 1).

Upon sufficient confirmation of a lane change at 230, method 200 may then proceed to 240, at which point a lane change assist (LCA) system may be updated using data from the lane change confirmation. For example, in some embodiments and implementations, a "zone of interest" associated with the LCA system may be updated/recalculated. In other words, for example, the duration and/or distance of travel in the current lane may be reset based upon the information that a lane change has taken place. In addition, the distance/extent of the lane change may also be used in updating the zone of interest. For example, if a lane width is known or previously sensed or otherwise detected, this predetermined lane width may be used to update a previous path and/or map of the host vehicle such that the zone of interest for alerting a driver to incoming targets may be similarly updated.

To provide a more specific example, some embodiments and implementations may determine a threshold distance associated with the current zone of interest. For example, the zone of interest may have a maximum distance behind the host vehicle within which the system will search for targets. Thus, in some embodiments, updating or recalculating the zone of interest based upon a detected/confirmed lane change may result in recalculation of this threshold distance. In some embodiments, this maximum distance may vary by the radius of the road. Thus, some such embodiments may utilize a radius of the turn of a host vehicle in the host vehicle path, the closing speed of the target(s), and/or the predicted time to collision with a target or targets in order to recalculate the maximum distance following detection and/or confirmation of a host lane change. Thus, for example, some embodiments may use a maximum threshold distance of about 25 meters for turns having a radius of between about 125 and about 250 meters, a maximum closing speed of 10 meters per second, and/or a time to collision of about 2.5 seconds, a maximum threshold distance of about 45 meters for turns having a radius of between about 250 and about 500 meters, a maximum closing speed of 15 meters per second, and/or a time to collision of about 3.0 seconds, and a maximum threshold distance of about 70 meters for turns having a radius of above 5000 meters (essentially straight), a maximum closing speed of 20 meters per second, and/or a time to collision of about 3.5 seconds. In some embodiments, the lane change assist system may be configured specifically to implement recalculation of zones of interest in accordance with accepted standards, such as ISO (International Organization for Standardization) and/or NCAP (The European New Car Assessment Programme) standards. For example, ISO standards may be used to adjust the maximum distance of the lane change assist system upon confirming a lane change in accordance with the inventive concepts disclosed herein.

Similarly, in some embodiments and implementations, the lane change assist system may recalculate a distance and/or time travelled in the new lane upon detecting and/or confirming that a lane change has taken place. Thus, in some embodiments recalculating a distance threshold upon lane change, the system may be configured to reset the new maximum distance to be the minimum of the available distances calculated using a turn radius and/or distance traveled by the host vehicle after the onset of the lane change.

Figure 3:
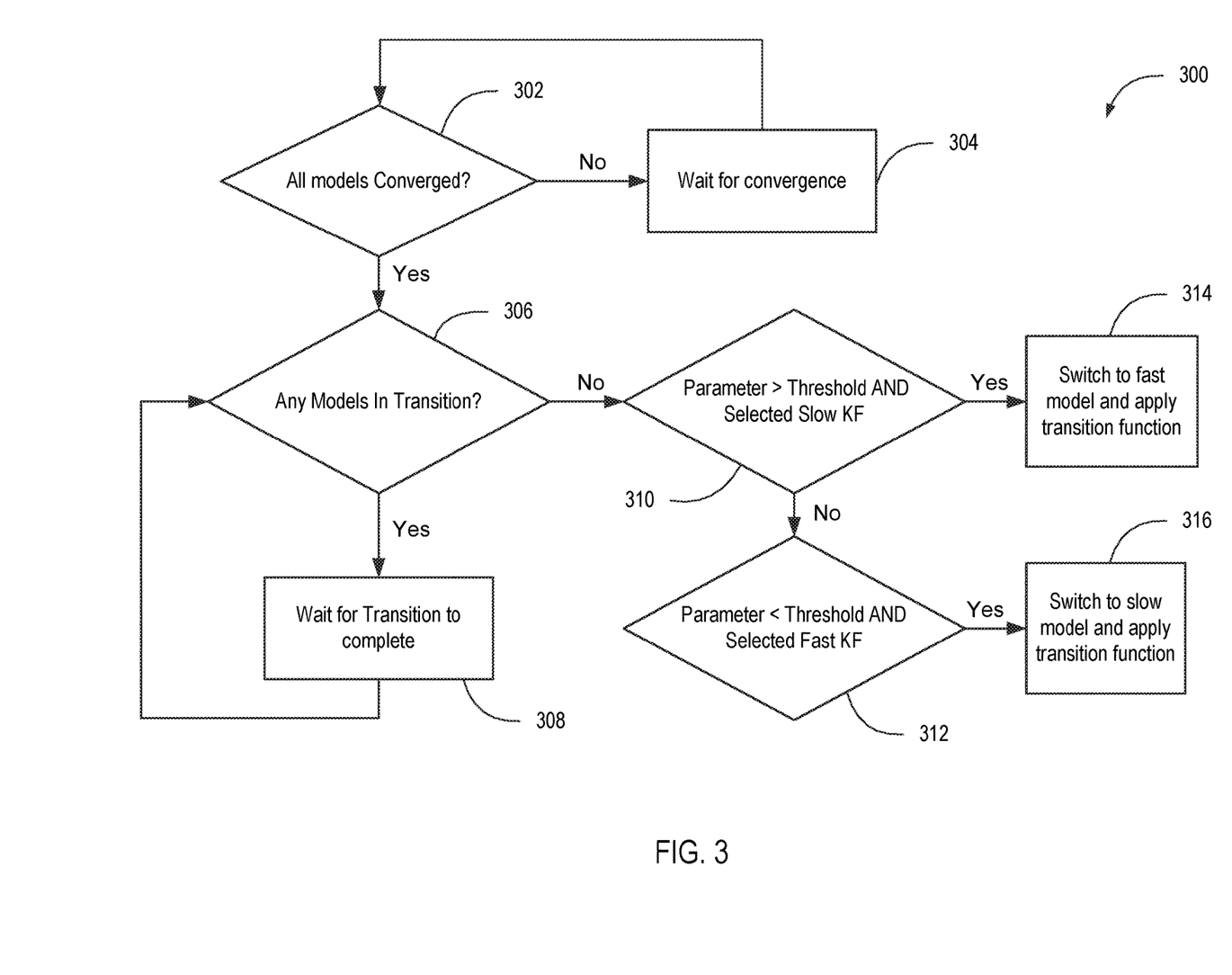
FIG. 3 is a flowchart representing a method for switching between two sub-modules of a filter module according to some implementations, which may be used to predict, detect, and/or confirm a vehicle lane change to improve a vehicle lane change system.

FIG. 3 is a flowchart representing a method 300 for switching between two sub-modules of a filter module, such as switching between models in an IMM filter, according to some implementations. As mentioned above and described in greater detail below, this switching between modules and/or models may be used to predict, detect, and/or confirm a vehicle lane change to improve a vehicle lane change system. As previously mentioned, method 300 may be used as part of a larger method, such as method 200, for confirming a lane change.

Method 300 may begin at 302, at which point a confirmation may take place that all of the models and/or modules of a filter module have converged to a stable value. Step 302 would typically take place upon startup of a vehicle and/or corresponding LCA system of a vehicle. Method 300 may await convergence at 304 and then, upon confirmation of sufficient convergence/stabilization, proceed to step 306.

At step 306, a determination may be made as to whether any of the sub-modules and/or models of the filter module are in transition. If so, the process awaits for the transition between models to complete at 308. If not, the method 300 proceeds to step 310, at which point a determination is made as to whether a predetermined parameter has exceeded a threshold. For example, if the current model is the slow/steady model, step 310 may, in some embodiments and implementations, comprise use of an innovation covariance threshold, such as a threshold number of standard deviations from the mean innovation covariance. The mean innovation covariance may be derived from a fading memory average filter. In some embodiments and implementations, the innovation covariance threshold may be heuristically tuned based on IMU Parameters provided by the manufacturer and/or drive data.

If the threshold has been met, the IMM or other filter may be switched to the fast/high maneuvering model at 314. If the threshold has not been met, method 300 may instead proceed to step 312, at which point a determination may be made as to whether another parameter (typically different than the first parameter) has exceeded another threshold. Typically, this would be a determination that the second parameter is less than the second threshold, as indicated in FIG. 3. If the current model is the fast/high maneuvering model, step 312 may, in some embodiments and implementations, also comprise use of an innovation covariance threshold, such as a threshold number of standard deviations from the mean innovation covariance (typically a lower number of standard deviations than the first threshold for switching from the slow to the high model).

If the second threshold has been exceeded (typically by being under the second threshold), then the filter may switch back to the steady/slow model, as indicated at 316.

Figure 4:
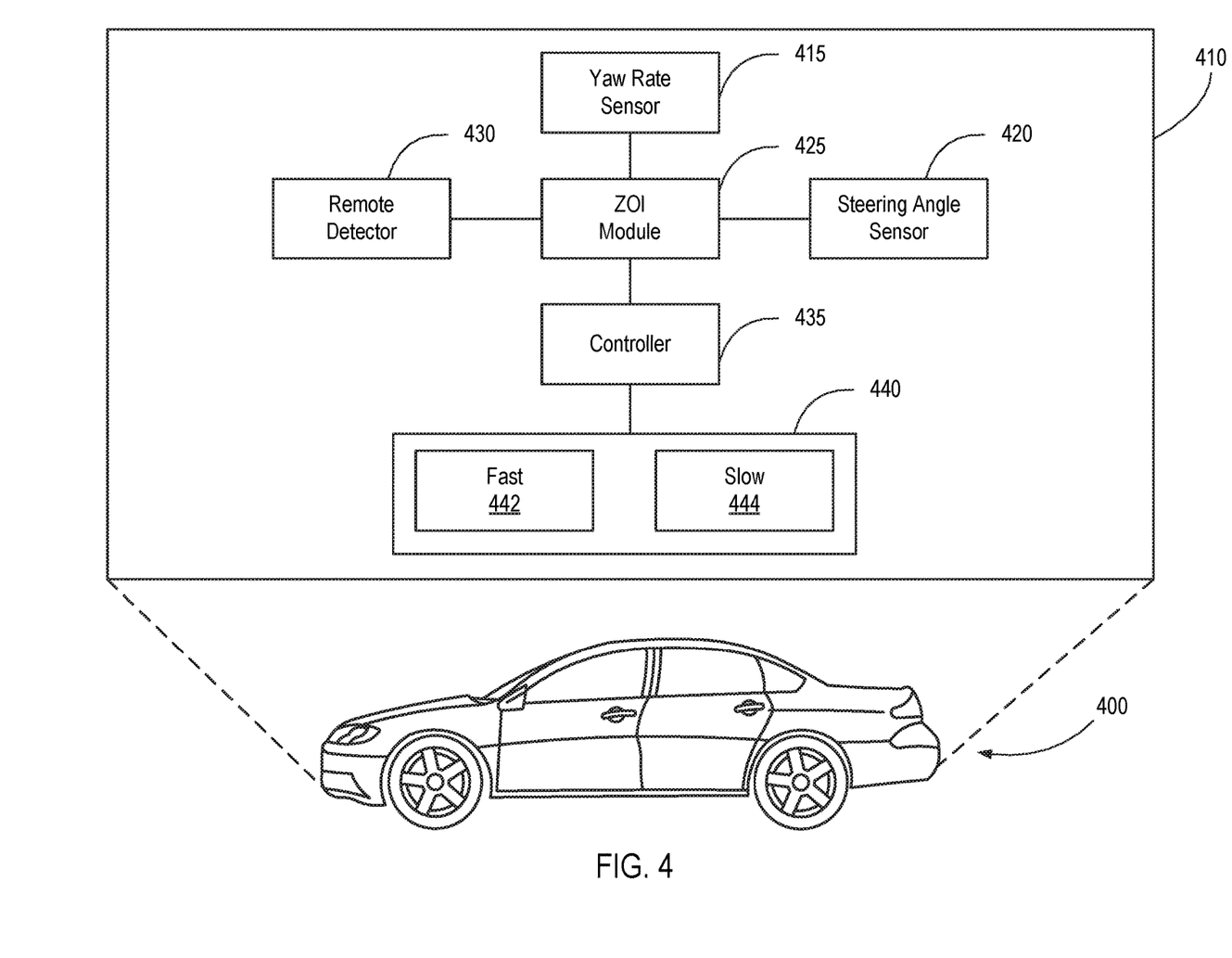
FIG. 4 is a schematic diagram of a vehicle comprising a vehicle lane change assist system according to some embodiments.

FIG. 4 is a schematic diagram of a vehicle 400 comprising a vehicle lane change assist system 410 according to some embodiments. Lane change assist system 410 may comprise one or more of the inventive concepts reference above, as well as any other elements available and/or known to those of ordinary skill in the art. Of course, as those of ordinary skill in the art will appreciate, one or more of the inventive elements/concepts disclosed herein may be added to another similar vehicle assist system utilizing RADAR or other remote detection/environmental sensors, such as LIDAR, LASERs, cameras, and the like.

Lane change assist system 410 may comprise a yaw sensor 415 and a steering sensor 420, which may comprise a steering wheel sensor in some embodiments. As mentioned above, one or both of these sensors may be used to provide data that may be used to predict and/or confirm a lane change. In addition, lane change assist system 410 may comprise a zone-of-interest (ZOI) module 425. ZOI module 425 may be configured to generate a map, and/or data representative of and/or usable to derive a map, of a path of a host vehicle and may further be configured to receive data from one or more remote detectors 430, such as from RADAR, LIDAR, cameras, etc., in order to detect target vehicles and, in some embodiments, assist a driver in making a lane change safely. A controller 435 may be provided in order to allow for processing of data from remote detector(s) 430, sensors 415 and/or 420, and/or a filter module 440, as described below. As used herein, the term controller refers to a hardware device that includes a processor and preferably also includes a memory element. The memory may be configured to store one or more of the modules referred to herein and the controller 435 and/or processor may be configured to execute the modules to perform one or more processes described herein.

As previously mentioned, in preferred embodiments and implementations, filter module 440 may comprise an IMM filter having multiple sub-modules/models. For example, filter module 440 comprises a fast/high-maneuvering model 442 and a slow/steady model 444. By providing a suitable process for transitioning between sub-modules/models, the switching between models may be used to predict and/or confirm a lane change, as previously discussed. More particularly, in some embodiments, the filter module 440 or another suitable element of system 410 may maintain a moving average of the innovations and compare them to two or more thresholds, such as an upper innovation covariance threshold and a lower innovation covariance threshold. Thus, for example, upon exceeding the upper threshold, filter module 440 may switch from the slow model 444 to the fast model 442. Similarly, upon exceeding (in the opposite direction) the lower threshold, filter module 440 may switch back from the fast model 442 to the slow model 444. And the switch between models (particularly from slow model 444 to fast model 442) may be used to predict and/or confirm a lane change.

As used herein, a software module or component may include any type of computer instruction or computer executable code located within a memory device and/or m-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Furthermore, embodiments and implementations of the inventions disclosed herein may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments and/or implementations may also be provided as a computer program product including a machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions. Memory and/or datastores may also be provided, which may comprise, in some cases, non-transitory machine-readable storage media containing executable program instructions configured for execution by a processor, controller/control unit, or the like.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A method for vehicle lane change detection, the method comprising the steps of:
   detecting at least one of a vehicle yaw rate and a steering angle associated with a vehicle using one or more sensors of the vehicle;
   generating a set of lane change data from the at least one of a vehicle yaw rate and a steering angle;
   using a first filter model to process the lane change data;
   comparing at least a subset of the processed lane change data with a threshold;
   upon detecting that the at least the subset of the processed lane change data has exceeded the threshold; switching the first filter model to a second filter model to predict a vehicle lane change; and
   using the second filter model to process the lane change data.

2. The method of claim 1, wherein the threshold comprises an innovation covariance threshold.

3. The method of claim 1, further comprising:
   after the step of switching the first filter model to the second filter model, comparing at least a subset of the processed lane change data with a second threshold; and
   upon detecting that at least a subset of processed lane change data has exceeded the second threshold, switching the second filter model to the first filter model.

4. The method of claim 1, wherein the first filter model comprises a steady vehicle maneuvering model, and wherein the second filter model comprises a high vehicle maneuvering model.

5. The method of claim 1, wherein the step of detecting at least one of a vehicle yaw rate and a steering angle associated with a vehicle comprises detecting both a vehicle yaw rate and a steering angle associated with the vehicle.

6. The method of claim 5, wherein the lane change data includes the vehicle yaw rate, and wherein the lane change data does not include the steering angle.

7. The method of claim 6, further comprising:
   using a transition from the first filter model to the second filter model to predict a vehicle lane change; and
   using a full-cycle confirmation of the steering angle to confirm the vehicle lane change.

8. The method of claim 7, further comprising, upon confirmation of the vehicle lane change using both the switch from the first filter model to the second filter model and the full-cycle confirmation of the steering angle, adjusting a parameter of a lane change assist system of the vehicle.

9. The method of claim 8, wherein the step of adjusting a parameter comprises setting a zone of interest of the lane change assist system.

* * * * *